United States Patent
Allouche et al.

(10) Patent No.: US 9,843,597 B2
(45) Date of Patent: Dec. 12, 2017

(54) CONTROLLER AREA NETWORK BUS MONITOR

(71) Applicant: International Business Machines Corporation, Armonk, NY (US)

(72) Inventors: Yair Allouche, Dvira (IL); Yossi Gilad, Tel-Mond (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 14/821,820

(22) Filed: Aug. 10, 2015

(65) Prior Publication Data

US 2016/0197944 A1 Jul. 7, 2016

Related U.S. Application Data

(60) Provisional application No. 62/099,603, filed on Jan. 5, 2015.

(51) Int. Cl.
*H04L 29/06* (2006.01)

(52) U.S. Cl.
CPC ........ *H04L 63/1416* (2013.01); *H04L 63/126* (2013.01); *H04L 63/1466* (2013.01)

(58) Field of Classification Search
CPC H04L 63/1416; H04L 63/126; H04L 63/1466
USPC ........................................................ 726/23
See application file for complete search history.

(56) References Cited

U.S. PATENT DOCUMENTS

| 4,622,458 | A | * | 11/1986 | Boeck | G01S 5/0009 250/203.1 |
|---|---|---|---|---|---|
| 5,072,391 | A | * | 12/1991 | Abe | G01R 31/007 340/439 |
| 5,815,071 | A | * | 9/1998 | Doyle | B60K 31/0058 340/12.25 |
| 6,160,813 | A | * | 12/2000 | Banks | H04L 49/357 370/422 |
| 6,233,509 | B1 | * | 5/2001 | Becker | G01R 31/006 701/32.7 |
| 6,385,210 | B1 | * | 5/2002 | Overberg | H04L 12/413 370/447 |
| 8,626,415 | B2 | * | 1/2014 | Geyer | B60T 8/267 188/282.2 |
| 9,121,145 | B2 | * | 9/2015 | Berning | E01C 19/00 |
| 2002/0123833 | A1 | * | 9/2002 | Sakurai | G07C 5/008 701/31.4 |
| 2004/0081079 | A1 | * | 4/2004 | Forest | H04L 12/417 370/216 |
| 2004/0164814 | A1 | * | 8/2004 | Misawa | G06F 1/3203 331/176 |

(Continued)

*Primary Examiner* — Hadi Armouche
*Assistant Examiner* — Shahriar Zarrineh

(57) ABSTRACT

Techniques for monitoring a controller area network bus are described herein. In one example, a system comprises a processor that is to detect a message from a source electronic control unit in a vehicle and calculate a location of the source electronic control unit based on at least two arrival times, the arrival times indicating a distance between a first monitor and the source electronic control unit. The processor can also detect that the message corresponds to a function controlled by a second electronic control unit and generate a warning that the message from the source electronic control unit is malicious.

14 Claims, 5 Drawing Sheets

(56) References Cited

U.S. PATENT DOCUMENTS

| | | | | |
|---|---|---|---|---|
| 2007/0030844 A1* | 2/2007 | Fukuta | G07B 15/063 | 370/359 |
| 2008/0186870 A1* | 8/2008 | Butts | H04L 41/0659 | 370/252 |
| 2008/0221838 A1* | 9/2008 | Peinsipp | G06F 1/12 | 702/189 |
| 2010/0131816 A1* | 5/2010 | Yamamoto | H04L 12/4013 | 714/749 |
| 2010/0180003 A1* | 7/2010 | Jiang | G06Q 10/06 | 709/208 |
| 2010/0298994 A1* | 11/2010 | Mitchell | A01M 7/0089 | 700/283 |
| 2011/0006941 A1* | 1/2011 | Samukawa | G01S 13/345 | 342/70 |
| 2011/0047630 A1* | 2/2011 | Cheng | H04L 9/3234 | 726/34 |
| 2011/0167147 A1* | 7/2011 | Andersson | H04L 43/0858 | 709/224 |
| 2012/0140861 A1* | 6/2012 | Menon | B60T 7/18 | 375/356 |
| 2013/0104231 A1* | 4/2013 | Niner | H04L 63/1416 | 726/23 |
| 2013/0139018 A1* | 5/2013 | Takada | H04L 12/407 | 714/748 |
| 2013/0198737 A1* | 8/2013 | Ricci | G06F 13/14 | 717/174 |
| 2013/0212659 A1* | 8/2013 | Maher | H04L 63/06 | 726/6 |
| 2013/0227648 A1* | 8/2013 | Ricci | G06F 3/0484 | 726/3 |
| 2014/0032800 A1* | 1/2014 | Peirce | H04L 67/12 | 710/105 |
| 2014/0035638 A1* | 2/2014 | Bode | H03L 7/1974 | 327/156 |
| 2014/0071995 A1* | 3/2014 | Hartwich | H04L 1/0002 | 370/468 |
| 2014/0195808 A1* | 7/2014 | Lortz | G06F 15/177 | 713/170 |
| 2014/0250528 A1* | 9/2014 | Moeller | H04L 63/1425 | 726/23 |
| 2014/0298133 A1* | 10/2014 | Hartwich | G06F 13/4295 | 714/758 |
| 2014/0324278 A1* | 10/2014 | Teng | G07C 5/008 | 701/31.5 |
| 2014/0328357 A1* | 11/2014 | Fredriksson | H04J 3/0614 | 370/520 |
| 2014/0334314 A1* | 11/2014 | Fredriksson | H04J 3/07 | 370/242 |
| 2014/0337976 A1* | 11/2014 | Moeller | H04L 63/1425 | 726/23 |
| 2015/0003443 A1* | 1/2015 | Koenigseder | H04W 40/20 | 370/350 |
| 2015/0020152 A1* | 1/2015 | Litichever | H04L 63/14 | 726/1 |
| 2015/0046060 A1* | 2/2015 | Nikovski | B60R 16/037 | 701/99 |
| 2015/0089236 A1* | 3/2015 | Han | H04L 9/3242 | 713/181 |
| 2015/0113638 A1* | 4/2015 | Valasek | H04L 63/1441 | 726/22 |
| 2015/0172298 A1* | 6/2015 | Otsuka | H04L 63/123 | 726/30 |
| 2015/0172306 A1* | 6/2015 | Kim | H04L 63/1425 | 726/23 |
| 2015/0331422 A1* | 11/2015 | Hartung | G05D 1/021 | 701/23 |
| 2016/0001718 A1* | 1/2016 | Laifenfeld | H04W 84/005 | 701/32.7 |
| 2016/0035147 A1* | 2/2016 | Huang | H04L 9/0869 | 701/31.4 |
| 2016/0142410 A1* | 5/2016 | Mazzara, Jr. | H04W 12/08 | 726/4 |
| 2016/0188396 A1* | 6/2016 | Sonalker | G06F 11/0739 | 714/37 |
| 2016/0254924 A1* | 9/2016 | Hartwich | H04L 69/10 | 370/468 |
| 2016/0286010 A1* | 9/2016 | Lennartsson | H04L 69/08 | |
| 2017/0013006 A1* | 1/2017 | Ujiie | H04L 12/6418 | |

* cited by examiner

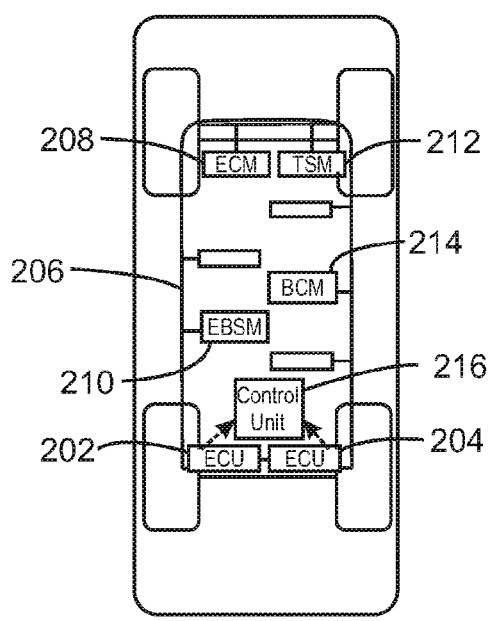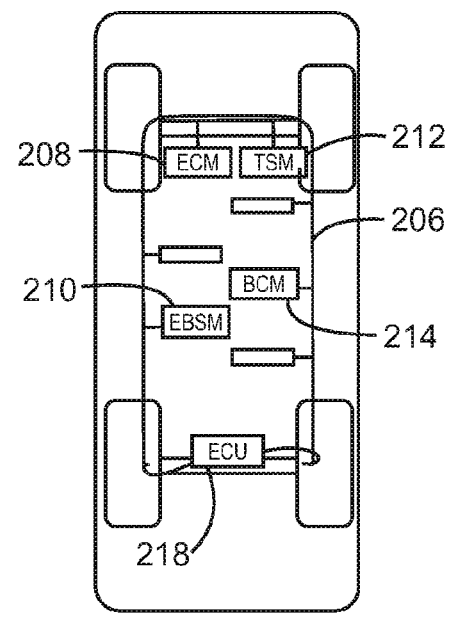
200A
FIG. 2A
200B
FIG. 2B

300

400

US 9,843,597 B2

CONTROLLER AREA NETWORK BUS MONITOR

RELATED APPLICATION DATA

The present application claims the benefit of U.S. Provisional Application No. 62/099,603, titled "Easy to Deploy Origin-Validation and Alert System for CAN-Bus Messages", and filed on Jan. 5, 2015, the entire contents of which are incorporated by reference as if included herein.

BACKGROUND

The present invention relates to monitoring data, and more specifically, but not exclusively, to monitoring data in a controller area network bus.

SUMMARY

According to an embodiment described herein, a system to monitor a controller area network bus can include a processor to detect a message from a source electronic control unit in a vehicle. The processor can also calculate a location of the source electronic control unit based on at least two arrival times, the arrival times indicating a distance between a first monitor and the source electronic control unit. Additionally, the processor can detect that the message corresponds to a function controlled by a second electronic control unit, and generate a warning that the message from the source electronic control unit is malicious.

According to another embodiment described herein, a method for monitoring a controller area network bus can include detecting, via a processor, a message transmitted by the controller area network from a source electronic control unit in a vehicle. The method can also include calculating, via the processor, a location of the source electronic control unit based on at least two arrival times, the arrival times indicating a distance between a first monitor and the source electronic control unit based in part on a wave propagation speed. Additionally, the method can include detecting, via the processor, that the message corresponds to a function controlled by a second electronic control unit, and generating, via the processor, a warning that the message from the source electronic control unit is malicious.

According to yet another embodiment described herein, a computer program product can monitor a controller area network bus, wherein the computer program product comprises a computer readable storage medium having program instructions embodied therewith and the computer readable storage medium is not a transitory signal per se. The program instructions can be executable by a processor to cause the processor to detect, via the processor, a message from a source electronic control unit in a vehicle and calculate, via the processor, a location of the source electronic control unit based on at least two arrival times, the arrival times indicating a distance between a first monitor and the source electronic control unit based in part on a wave propagation speed. Furthermore, the program instructions can cause the processor to detect, via the processor, that the message corresponds to a function controlled by a second electronic control unit and generate, via the processor, a warning that the message from the source electronic control unit is malicious.

BRIEF DESCRIPTION OF THE SEVERAL VIEWS OF THE DRAWINGS

FIG. 2A depicts two monitor units for monitoring a controller area network bus according to an embodiment described herein;

FIG. 2B depicts a single monitor unit for monitoring a controller area network bus according to an embodiment described herein;

DETAILED DESCRIPTION

Modern vehicles are monitored and controlled by dozens of electronic control units (ECUs) which communicate and coordinate using an intra-vehicle network. The de-facto standard of the automotive industry for establishing network-connectivity between ECUs is the Controller Area Network bus (also referred to herein as CAN-bus). The CAN-bus establishes broadcast communication between ECUs, allowing near real time communication that is required to support in-vehicle systems including critical safety systems such as anti-lock braking, air-bags, and crash-prediction.

The CAN-bus architecture was designed to provide a reliable channel for short control messages that is robust to errors and malfunctions. Accordingly, the CAN protocol supports message prioritization and integrates cyclic redundancy checks to ensure that messages arrive without errors. However, the CAN protocol was not designed for security. For example, the source of a CAN message is not authenticated and not even specified in messages. Therefore, a compromised ECU can send spoofed malicious messages, which can compromise the safety of the vehicle and pose a danger to passengers in case of a cyber-attack. A hacker may compromise an ECU by exploiting vulnerabilities in the ECU's firmware or by transmitting malware to the vehicle's electronic control systems (e.g., by connecting to the physical on-board diagnostic interface). The risk for attacks increases as vehicles communicate with each other (using vehicle to vehicle communication) or with the infrastructure (vehicle to infrastructure communication) and establish vehicular ad-hoc networks. This provides a greater attack surface and allows compromised vehicles to infect the vehicles around them. Therefore, the security of the vehicle's embedded systems and communication links between them has become a concern for manufacturers.

The system described herein monitors the CAN-bus and detects a location of an ECU that generates a message by leveraging the communication properties of the CAN-bus. The system described herein does not require interactive protocols such as changes to existing ECUs, which can create a deployment problem. Furthermore, the techniques described herein avoid implementing a cryptographic challenge-response protocol, which has unreasonable overhead for communication over the CAN-bus. Rather, the origin-detection technique described herein is passive and does not incur any overhead on CAN-bus communications and does not require updating existing ECUs or firmware.

Figure 1:
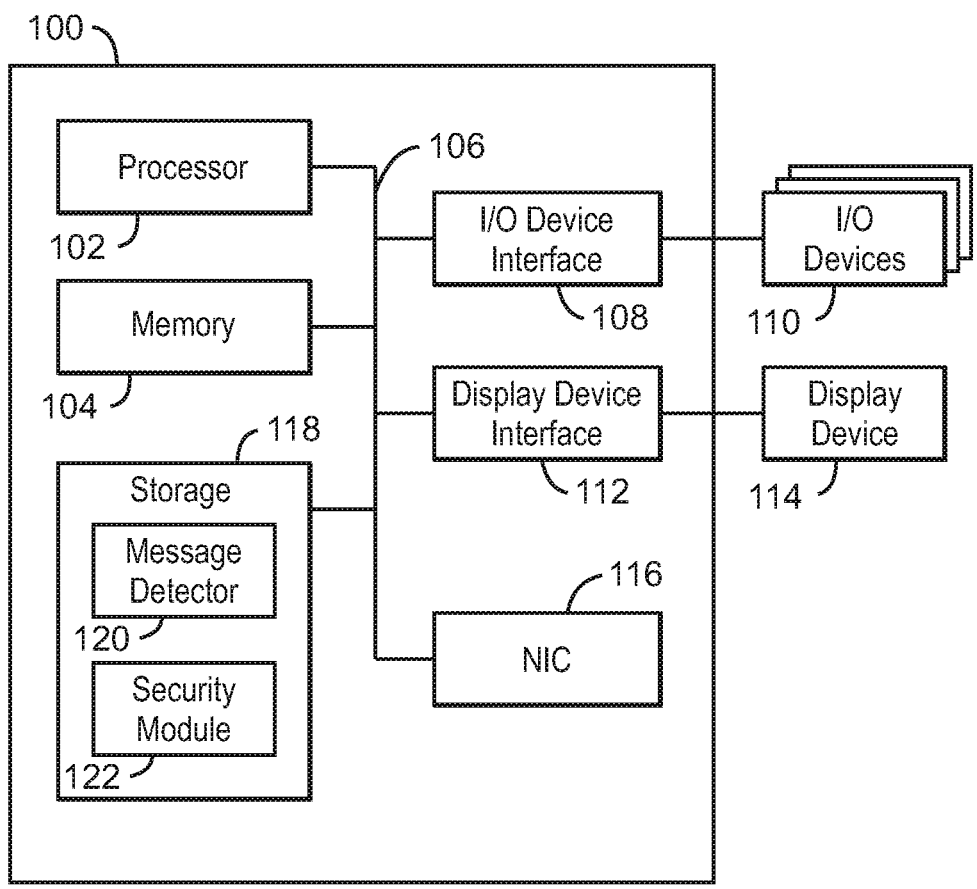
FIG. 1 depicts a block diagram of an electronic control module that can monitor a controller area network bus according to an embodiment described herein.

FIG. 1 is a block diagram of an example electronic control module monitor that can monitor a controller area network bus. The electronic control module monitor 100 may be, for example, a mobile phone, laptop computer, desktop computer, or tablet computer, among others. The electronic control module monitor 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to monitor a controller area network bus.

The processor 102 may be connected through a system bus 106 (e.g., PCI, ISA, PCI-Express, NuBus, etc.) to an input/output (I/O) device interface 108 adapted to connect the electronic control module monitor 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the electronic control module monitor 100, or may be devices that are externally connected to the electronic control module monitor 100.

The processor 102 may also be linked through the system bus 106 to a display device interface 112 adapted to connect the electronic control module monitor 100 to a display device 114. The display device 114 may include a display screen that is a built-in component of the electronic control module monitor 100. The display device 114 may also include a computer monitor, television, or projector, among others, that is externally connected to the electronic control module monitor 100. A network interface card (NIC) 116 may also be adapted to connect the electronic control module monitor 100 through the system bus 106 to a network (not depicted).

The storage 118 can include a hard drive, an optical drive, a USB flash drive, an array of drives, or any combinations thereof. The storage 118 may include a message detector 120 that can detect a message from any suitable source electronic control unit in a vehicle. For example, the message detector 120 can detect a message from an engine control module (ECM), an electronic brake control module (EBSM), a transmission control module (TSM), and a body control module (BCM), among others. The message detector 120 can also calculate a location of the source electronic control unit based on at least two arrival times, the arrival times indicating a distance between the electronic control module monitor 100 and the source electronic control unit. For example, a source electronic control unit can transmit messages in two directions on a CAN-bus. Accordingly, the electronic control module monitor 100 can detect an arrival time associated with messages that are transmitted in either direction on the CAN-bus. In some embodiments, storage 118 can also include a security module 122 that can detect that the message corresponds to a function controlled by a second electronic control unit. In some examples, the security module 122 can detect that the source electronic control unit generates a message pertaining to a function that is performed by another electronic control unit. For example, the security module 122 can detect that an engine control module (ECM) generates a message pertaining to a braking function controlled by an electronic brake control module (EBSM).

In some examples, the security module 122 can also generate a warning that the message from the source electronic control unit is malicious. For example, the security module 122 can generate a warning that the message generated by the source electronic control unit is malicious because the message pertains to a function controlled by another electronic control unit. The security module 122 can also generate a warning that the message is malicious based on a determination that the distance between source electronic control unit and the authorized electronic control unit exceeds a threshold. For example, the warning can indicate that the function of the message is associated with an electronic control unit that is located a distance from the source electronic control unit that exceeds a predetermined threshold.

It is to be understood that the block diagram of FIG. 1 is not intended to indicate that the electronic control module monitor 100 is to include all of the components shown in FIG. 1. Rather, the electronic control module monitor 100 can include fewer or additional components not illustrated in FIG. 1 (e.g., additional applications, additional modules, additional memory devices, additional network interfaces, etc.). Furthermore, any of the functionalities of the message detector 120 and security module 122, may be partially, or entirely, implemented in hardware and/or in the processor 102. For example, the functionality may be implemented with an application specific integrated circuit, in logic implemented in the processor 102, or in any other device.

FIG. 2A depicts two electronic control unit monitors (also referred to herein as monitor units) for monitoring a controller area network bus in a vehicle according to an embodiment described herein. The two monitor units 202 and 204 can monitor messages and data transmitted on the controller area network bus 206. In some embodiments, the controller area network bus 206 can transmit messages and data for any suitable number of electronic control units such as an engine control module (ECM) 208, an electronic brake control module (EBSM) 210, a transmission control module (TSM) 212, and a body control module (BCM) 214, among others.

In some embodiments, the monitor units 202 and 204 are located at the edge of the controller area network bus 206. In some examples, the monitor units 202 and 204 can transmit data to a control unit 216, which can standardize time readings associated with messages. For example, the control unit 216 can standardize times associated with messages received by the monitor unit 202 and times associated with messages received by the monitor unit 204. The control unit 216 can also validate the source electronic control unit of each bit in a message's payload. For example, the control unit 216 can detect the distance between the source electronic control unit and a monitor unit 202 or 204 and then the control unit 216 can determine if the source electronic control unit is valid. In some embodiments, the validity of the source electronic control unit (also referred to herein as source ECU) depends on the contents of the message. For example, the contents of the message should correspond to the functions managed by the source ECU.

In some embodiments, the monitor units 202 and 204 can record the arrival time stamp of the first bit in a message payload and monitor collisions on the CAN-bus in the middle of message transmission. In this example, each monitor unit 202 and 204 sends to the control unit 216 the message, the first-bit of the arrival time stamp, and a binary indication for whether there was a collision during transmission of the message's payload. The control unit 216 validates that the source of the first bit is authorized to send the message and that there was no collision on the CAN-bus.

FIG. 2B depicts a single monitor unit for monitoring a controller area network bus in a vehicle according to an embodiment described herein. The monitor unit 218 can monitor messages and data transmitted on the controller area network bus 206. As discussed above, in some embodiments, the controller area network bus 206 can transmit messages and data for any suitable number of modules such as an engine control module (ECM) 208, an electronic brake control module (EBSM) 210, a transmission control module (TSM) 212, and a body control module (BCM) 214, among others.

In some embodiments, the monitor unit 218 can be attached to each end of the controller area network bus 206. In some examples, the two arrival time stamp measurements associated with a message's payload are produced by a single clock, thereby, avoiding clock synchronization challenges and reducing deployment costs. Furthermore, detecting messages transmitted on a controller area network bus 206 with a single monitor 218 eliminates the requirement for a control unit. The monitor unit 218 can be configured with distances and message identifiers of various modules 208, 210, 212, and 214 that transmit data on the controller area network bus 206. The monitor unit 218 can then monitor the controller area network bus 218 to detect a source ECU associated with a message and, if necessary, provide warning messages indicating malicious messages have been detected.

Figure 3:
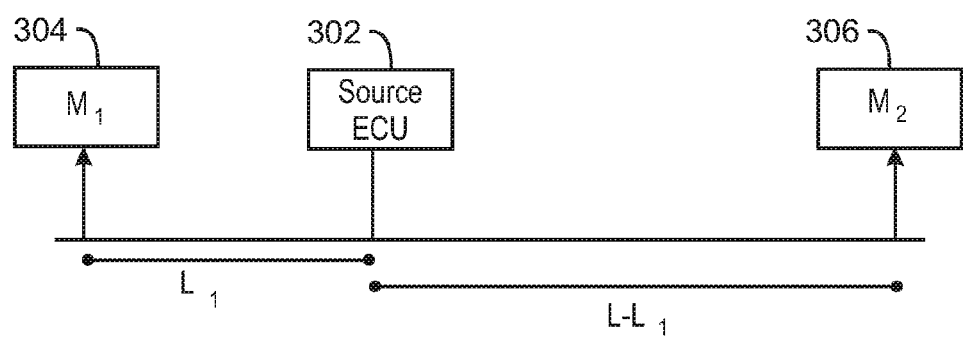
FIG. 3 depicts a technique for calculating a distance between a monitor unit and a source electronic control unit in a controller area network according to an embodiment described herein.

FIG. 3 depicts a technique for calculating a distance between a monitor unit and a source electronic control unit in a controller area network according to an embodiment described herein. The source electronic control unit 302 can include any suitable module that transmits data or messages via the controller area network bus. For example, the source control unit can include the engine control module (ECM) 208, electronic brake control module (EBSM) 210, transmission control module (TSM) 212, or body control module (BCM) 214 of FIG. 2A, among others.

In some embodiments, monitor units M1 304 and M2 306 can be placed on the controller area network bus on either side of a source electronic control unit 302. In some examples, the monitor units M1 304 and M2 306 are placed at either end of the controller area network bus. The monitor units M1 304 and M2 306 can be used to identify a location of the source electronic control unit 302 that transmits a message. For example, the monitor units M1 304 and M2 306 can detect at least two Arrival Time Stamps (also referred to herein as ATS). Each monitor unit M1 304 and M2 306 can include a clock recorder that enables detecting the location of the source electronic control unit 302 on the controller area network bus. For example, the monitor units M1 304 and M2 306 can determine low level characteristics of the CAN-bus in order to detect the location of the source ECU on the CAN-bus. In some embodiments, the low level characteristics can include a propagation delay that is equal to d/C, where d is the distance between a source or sender module and a recipient module, and C is the wave propagation speed. Accordingly, the arrival time stamp (ATS) measurements can be modeled by Equation 1 below, where tS and tR denote the sending time of the message and receiving time of the message respectively. Additionally, $\epsilon$ denotes the measurement error (e.g., due to clock inaccuracy), which is bounded, i.e., $|\epsilon| \leq \Delta$.

$$tR = tS + d/C + \epsilon(1) \quad \text{Eq}(1)$$

The location of the source ECU 302 on the Can-bus can be determined by the distance between the source ECU 302 and monitor unit M1 304 and M2 306. In FIG. 3, L denotes the distance between the two monitor units M1 304 and M2 306. Additionally, L1 denotes the distance between the source ECU 302 that transmits a message and the monitor M1 304. The following Equation 2 can estimate the distance from the source ECU 302 to monitor M1 304:

$$L'1 = C/2(t1R - t2R + I/C) \quad \text{Eq}(2)$$

In Equation 2, L'1 denotes the estimated distance between the source ECU 302 and the monitor M1 304. Additionally, t1R and t2R denote the message receiving time at M1 304 and M2 306 respectively. The estimation error of the location of the source ECU 302 is bounded by $\Delta C$, where $|L'1 - L1| < \Delta C$. In some examples, $$t1R = t0 + I1/C + \epsilon 1 \quad \text{Eq}(3)$$

$$t2R = t0 + (I - I1)/C + \epsilon 2 \quad \text{Eq}(4)$$

In Equation 3 and Equation 4, t0 denotes the transmission time between the source ECU 302 and a monitor unit M1 304 or M2 306. Additionally, $\epsilon 1$ and $\epsilon 2$ denote the error in arrival time stamps determined by monitor unit M1 304 and monitor unit M2 306 respectively. In some examples, $|\epsilon 1|$, $|\epsilon 2| \leq \Delta$. Equations 3 and 4 can be used to determine L1 in some embodiments. For example, L1 can be determined by Equation 5:

$$L1 = C/2(t1R - t2R + I/C + \epsilon 1 - \epsilon 2) \quad \text{Eq}(5)$$

In some embodiments, the error bound can be determined using Equation 6 below:

$$|L'1 - L1| = |C/2(t1R - t2R + L/C) - C/2(t1R - t2R + L/C + \epsilon 1 - \epsilon 2)| = C/2|\epsilon 1 - \epsilon 2| \leq C/2 \, 2\Delta = \Delta C \quad \text{Eq}(6)$$

In some examples, the error bound may not depend on the location of the source ECU 302 on the CAN-bus or the transmission time.

If an authorized source ECU 302 sent the message, then no alert will be initiated. Alternatively, if the location of the source ECU 302 is distant by more than a predetermined amount from any of the authorized source ECUs, then the control unit can generate an alert. Similarly, if a source ECU 302 transmits a message while another ECU sends the payload of a legitimate message, then the control unit can generate an alert. Furthermore, since the alerts identify the location of the source ECU 302, this provides valuable information to identify and mitigate the attack by patching or replacing the ECU that generated a malicious message.

Figure 4:
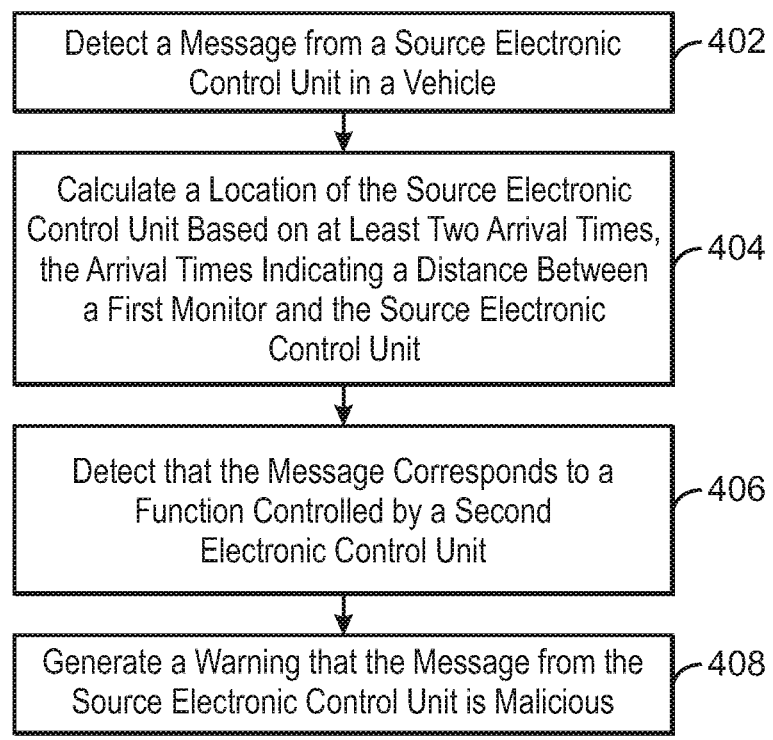
FIG. 4 is a process flow diagram of an example method that can monitor a controller area network bus according to an embodiment described herein.

FIG. 4 is a process flow diagram of an example method that can monitor a controller area network bus according to an embodiment described herein. The method 400 can be implemented with any suitable computing device, such as the electronic control module monitor 100 of FIG. 1.

At block 402, the message detector 120 can detect a message from a source electronic control unit in a vehicle. In some examples, the message detector 120 can observe any number of messages transmitted via the CAN-bus and record the arrival time stamps for the payload of each message. The payload, as referred to herein, can include header information and data bits. In some examples, the payload may not exceed a predetermined number of bits. The header information can include a start of frame and end of frame indicator, a unique identifier that represents a priority level of a message, control information, such as a remote transmission request, an identifier extension bit (IDE), and data length code, a cyclic redundancy check and delimiter, and an acknowledgement slot and delimiter, among others.

At block 404, the message detector 120 can calculate a location of the source electronic control unit based on at least two arrival times, the arrival times indicating a distance between a first monitor and the source electronic control unit. In some examples, the first message detector 120 can calculate the location of the source electronic control unit based on the distance from the first message detector 120 to the source electronic control unit and a distance from a second monitor unit to the source electronic control unit. In other embodiments, the first message detector 120 can calculate the location of the source ECU using two arrival times determined solely by the first message detector 120. As discussed above in relation to FIG. 3, in some embodiments, the first message detector 120 can calculate the distance between a source ECU and the first message detector 120 based on arrival times that indicate a wave propagation speed and a propagation delay.

At block 406, the security module 122 can detect that the message corresponds to a function controlled by a second electronic control unit. For example, the security module 122 can be configured with the distance of each electronic control unit on a CAN-bus from any suitable number of monitor units. The security module 122 can also include a list of message identifiers corresponding to each electronic control unit. For example, an engine control module may send notifications related to revolutions per minute, but not about the vehicle's speed. In some embodiments, the security module 122 can detect the function associated with a message by analyzing identifiers located in the header information of the message, such as a message identifier, and comparing the identifiers to the physical location of the ECU.

At block 408, the security module 122 can generate a warning that the message from the source electronic control unit is malicious. For example, the security module 122 can generate a warning if the source ECU's location is more than a predetermined distance from any of the authorized sources that can generate the message. For example, an authorized source indicates that an electronic control unit manages the functions included in a message generated by the electronic control unit. The security module 122 generates a warning if the authorized source did not generate the message. Furthermore, if a source ECU transmits a message while another ECU sends the payload of a message from an authorized source, then the security module 122 can generate a warning.

In some embodiments, when the security module 122 detects that a message is spoofed or generated by an unauthorized ECU, the security module 122 can react in real-time to invalidate that message and cause all ECUs on the CAN-bus to discard the message. For example, the security module 122 may have permission to operate in a read-write mode on the CAN-bus. In order to invalidate a spoofed message, the security module 122 can leverage the recessive property of '1'-bits in the CAN-bus architecture. Specifically, when two ECUs transmit '0' and '1' bits simultaneously, all ECUs can read a '0'-bit from the CAN-bus. Furthermore, the CAN-bus protocol mandates that a valid message's CRC field ends with a '1'-bit. This allows the security module 122 to verify that the source of the message is authorized. If the source ECU was not authorized to transmit a message (i.e., the message is spoofed), the security module 122 can modify a cyclic redundancy check corresponding to the message, wherein the modified cyclic redundancy check invalidates the message. For example, the security module 122 can transmit a '0'-bit simultaneously with the spoofed-message's CRC-delimiter located at the end of the message. This ensures that the spoofed message's CRC ends with a '0'-bit rather than a '1'-bit, thus invalidating the message and causing all ECUs on the bus to discard or block the message.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the security module 122 may communicate with the CAN-bus using a read only protocol. Accordingly, the security module 122 can transmit the warning to an external computing device residing on any suitable secondary bus.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the users computer, partly on the users computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
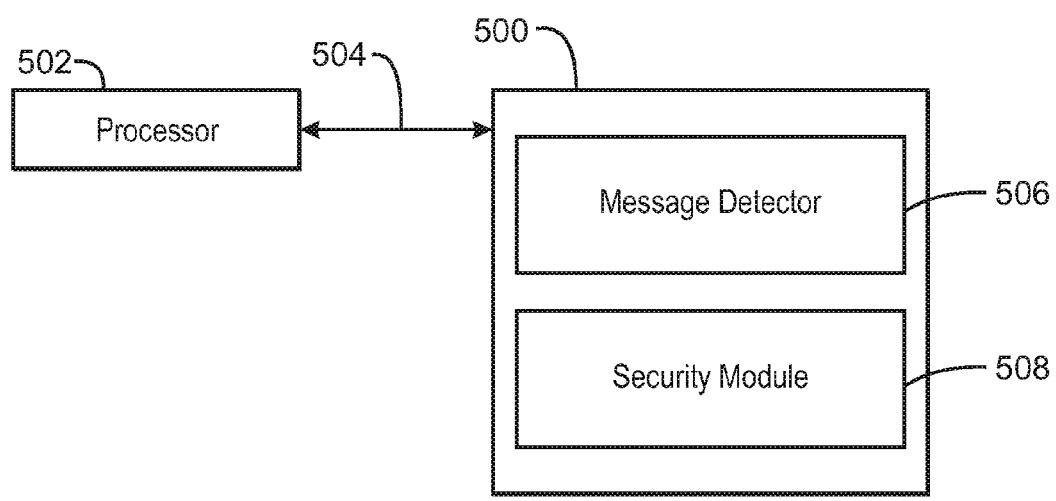
FIG. 5 is a tangible, non-transitory computer-readable medium that can monitor a controller area network bus according to an embodiment described herein.

Referring now to FIG. 5, a block diagram is depicted of an example of a tangible, non-transitory computer-readable medium that can monitor a controller area network bus. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, a message detector 506 can detect a message from any suitable source electronic control unit in a vehicle. For example, the message detector 506 can detect a message from an engine control module (ECM), an electronic brake control module (EBSM), a transmission control module (TSM), and a body control module (BCM), among others. The message detector 506 can also calculate a location of the source electronic control unit based on at least two arrival times, the arrival times indicating a distance between the electronic control module monitor and the source electronic control unit.

In some embodiments, a security module 508 can detect that the message corresponds to a function controlled by a second electronic control unit. In some examples, the security module 508 can detect that the source electronic control unit generates a message pertaining to a function that is performed by another electronic control unit. For example, the security module 508 can detect that an engine control module (ECM) generates a message pertaining to a braking function controlled by an electronic brake control module (EBSM), and the like. In some examples, the security module 508 can also generate a warning that the message from the source electronic control unit is malicious.

It is to be understood that any number of additional software components not shown in FIG. 5 may be included within the tangible, non-transitory, computer-readable medium 500, depending on the specific application.

What is claimed is:

1. A system to monitor a controller area network bus comprising:
 a hardware processor to:
 detect a message from a source electronic control unit in a vehicle;
 calculate a location of the source electronic control unit based on at least two arrival times and based on a distance from a first monitor to the source electronic control unit and a distance from a second monitor to the source electronic control unit, wherein the at least two arrival times comprise an error estimating a clock inaccuracy due to clock synchronization, wherein the error is bounded based at least in part on a wave propagation speed;
 detect that a distance between the location of the source electronic control unit and a location of a predetermined authorized electronic control unit that processes a function corresponding to the message exceeds a predetermined threshold and that clock values for the source electronic control unit and the predetermined authorized electronic control unit are different; and generate a warning that the message from the source electronic control unit is malicious in response to detecting a collision on the controller area network bus during transmission of the message and based on the distance between the source electronic control unit and the predetermined authorized electronic control unit and the different clock values, wherein the warning indicates the location of the source electronic control unit that is to be replaced or patched; and invalidate the message by transmitting a zero bit simultaneously with a cyclic redundancy check delimiter corresponding to the message.

2. The system of claim 1, wherein the first monitor communicates with the controller area network bus via a read only protocol.

3. The system of claim 2, wherein the hardware processor is to transmit the warning to an external computing device residing on a secondary bus.

4. The system of claim 1, wherein the first monitor communicates with the controller area network bus via a read-write protocol.

5. The system of claim 1, wherein the arrival times indicate a propagation delay based on the distance between the source electronic control unit and the first monitor.

6. A method for monitoring a controller area network bus comprising:

detecting, via a hardware processor, a message transmitted by the controller area network from a source electronic control unit in a vehicle;

calculating, via the hardware processor, a location of the source electronic control unit based on at least two arrival times and based on a distance from a first monitor to the source electronic control unit and a distance from a second monitor to the source electronic control unit, wherein the at least two arrival times comprise an error estimating a clock inaccuracy due to clock synchronization, and wherein the error is bounded based at least in part on a wave propagation speed;

detecting that a distance between the location of the source electronic control unit and a location of a predetermined authorized electronic control unit that processes a function corresponding to the message exceeds a predetermined threshold and that clock values for the source electronic control unit and the predetermined authorized electronic control unit are different; and generating, via the hardware processor, a warning that the message from the source electronic control unit is malicious in response to detecting a collision on the controller area network bus during transmission of the message and based on the distance between the source electronic control unit and the predetermined authorized electronic control unit and the different clock values, wherein the warning indicates the location of the source electronic control unit that is to be replaced or patched; and invalidating the message by transmitting a zero bit simultaneously with a cyclic redundancy check delimiter corresponding to the message.

7. The method of claim 6, wherein the first monitor communicates with the controller area network bus via a read only protocol.

8. The method of claim 6, comprising transmitting the warning to an external computing device residing on a secondary bus.

9. The method of claim 6, wherein the first monitor communicates with the controller area network bus via a read/write protocol.

10. The method of claim 6, wherein the arrival times indicate a propagation delay based on the distance between the source electronic control unit and the first monitor.

11. A computer program product for monitoring a controller area network bus, the computer program product comprising a computer readable storage medium having program instructions embodied therewith, wherein the computer readable storage medium is not a transitory signal per se, the program instructions executable by a hardware processor to cause the hardware processor to:

detect, via the hardware processor, a message from a source electronic control unit in a vehicle;

calculate, via the hardware processor, a location of the source electronic control unit based on at least two arrival times and based on a distance from a first monitor to the source electronic control unit and a distance from a second monitor to the source electronic control unit, wherein the at least two arrival times comprise an error estimating a clock inaccuracy due to clock synchronization, and wherein the error is bounded based at least in part on a wave propagation speed;

detect that a distance between the location of the source electronic control unit and a location of a predetermined authorized electronic control unit that processes a function corresponding to the message exceeds a predetermined threshold and that clock values for the source electronic control unit and the predetermined authorized electronic control unit are different; and generate, via the hardware processor, a warning that the message from the source electronic control unit is malicious in response to detecting a collision on the controller area network bus during transmission of the message and based on the distance between the source electronic control unit and the predetermined authorized electronic control unit and the different clock values, wherein the warning indicates the location of the source electronic control unit that is to be replaced or patched; and invalidate the message by transmitting a zero bit simultaneously with a cyclic redundancy check delimiter corresponding to the message.

12. The computer program product of claim 11, wherein the arrival times indicate a propagation delay based on the distance between the source electronic control unit and the first monitor.

13. The computer program product of claim 11, wherein the first monitor communicates with the controller area network bus via a read only protocol.

14. The computer program product of claim 13, wherein the program instructions cause the hardware processor to transmit the warning to an external computing device residing on a secondary bus.

* * * * *